(12) United States Patent
Kuwada

(10) Patent No.: US 8,570,591 B2
(45) Date of Patent: Oct. 29, 2013

(54) COLOR CONVERSION DEVICE, COLOR CONVERSION METHOD AND COMPUTER READABLE MEDIUM CALCULATE A MINIMUM REQUIRED BLACK AMOUNT IN REGARD TO COLORS THAT ARE REPRODUCED BY AN OUTPUT DEVICE THAT ACTUALLY OUTPUTS

(75) Inventor: Yoshitaka Kuwada, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 951 days.

(21) Appl. No.: 12/621,932

(22) Filed: Nov. 19, 2009

(65) Prior Publication Data

US 2010/0271644 A1    Oct. 28, 2010

(30) Foreign Application Priority Data

Apr. 24, 2009   (JP) .................. 2009-106155

(51) Int. Cl.
| | |
|---|---|
| G06F 3/12 | (2006.01) |
| G06K 15/00 | (2006.01) |
| H04N 1/60 | (2006.01) |
| H04N 1/40 | (2006.01) |
| G09G 1/28 | (2006.01) |
| G09G 3/28 | (2013.01) |
| G09G 3/36 | (2006.01) |
| G09G 5/02 | (2006.01) |

(52) U.S. Cl.
USPC ............ 358/1.9; 358/1.1; 358/1.6; 358/2.1; 358/3.02; 345/22; 345/72; 345/89; 345/590

(58) Field of Classification Search
USPC ........... 358/1.9, 1.1, 2.1, 302, 527, 536, 540, 358/518, 515, 517, 521, 512, 500, 1.6, 1.4, 358/3.06, 3.22, 3.23, 3.24, 501, 504; 348/31, 32, 33; 345/418, 593, 597, 345/598, 599, 603, 604, 661, 672, 501, 530, 345/7, 596, 89, 682, 590, 22, 72, 83; 347/15, 24, 43, 63, 100, 115, 112, 172, 347/178, 188; 399/38, 39, 40, 49, 53, 54, 399/58, 72, 112, 181, 182, 183, 184, 194, 399/231, 298, 301

See application file for complete search history.

(56) References Cited

U.S. PATENT DOCUMENTS

| | | | |
|---|---|---|---|
| 8,203,751 B2 | 6/2012 | Sakamoto et al. | |
| 2002/0112982 A1* | 8/2002 | Stagray et al. | 206/494 |

(Continued)

FOREIGN PATENT DOCUMENTS

| | | |
|---|---|---|
| JP | A-10-262157 | 9/1998 |
| JP | A-2000-280531 | 10/2000 |

(Continued)

OTHER PUBLICATIONS

Ryosuke, Color Conversion Method Color Conversion Apparatus Color Coversion Program and Storage Medium, Feb. 15, 2007, Machine Translated Japanese Patent Application Publication, JP2007043250, all pages.*

(Continued)

*Primary Examiner* — Ngon Nguyen
(74) *Attorney, Agent, or Firm* — Oliff & Berridge, PLC

(57) ABSTRACT

A color conversion device include a limit value setting unit that sets, in accordance with a color gamut, a limit value of a color material total amount that is used in an output device that uses color materials of M colors including black, where M is an integer equal to or larger than 4, and outputs an image; and a black amount determining unit that calculates a total amount limit value corresponding to the color gamut for each black amount on the basis of the limit value that has been set in accordance with the color gamut by the limit value setting unit and determines a black amount from a conversion target-independent color signal of a device-independent color space.

19 Claims, 9 Drawing Sheets

(56) References Cited

U.S. PATENT DOCUMENTS

| | | | |
|---|---|---|---|
| 2004/0126009 A1* | 7/2004 | Takenaka et al. | 382/162 |
| 2005/0168762 A1* | 8/2005 | Tsuchiya et al. | 358/1.9 |
| 2006/0232799 A1* | 10/2006 | Nakatani et al. | 358/1.9 |
| 2008/0112611 A1* | 5/2008 | Sasaki | 382/162 |
| 2009/0080005 A1 | 3/2009 | Sakamoto et al. | |
| 2009/0116046 A1* | 5/2009 | Nakashio | 358/1.9 |

FOREIGN PATENT DOCUMENTS

| | | |
|---|---|---|
| JP | A-2004-112269 | 4/2004 |
| JP | A-2005-64774 | 3/2005 |
| JP | A-2006-140661 | 6/2006 |
| JP | A-2006-352475 | 12/2006 |
| JP | A-2007-43250 | 2/2007 |
| JP | A-2007-282194 | 10/2007 |
| JP | A-2009-077106 | 4/2009 |

OTHER PUBLICATIONS

Hiroaki, Method for Predicting Color Transfer Characteristics, Sep. 29, 1998, Machine Translated Japanese Patent Application Publication, JP10262157, all pages.*

Makoto et al., Method and Apparatus for Processing Color Storage Medium Color Processing program and Image Forming Apparatus, Aug. 4, 2004, Machine Translated Japanese Patent Application Publication, JP2004112269, all pages.*

Makoto, Numerical Processing Device Color Processing Device Numerical Processing Program Color Processing Program and Storage Medium, Oct. 3, 2005, Machine Translated Japanese Patent Application Publication, JP2005064774, all pages.*

Jan. 16, 2013 Office Action for Japanese Patent Application No. 2009-106155 (with translation).

* cited by examiner

COLOR CONVERSION DEVICE, COLOR CONVERSION METHOD AND COMPUTER READABLE MEDIUM CALCULATE A MINIMUM REQUIRED BLACK AMOUNT IN REGARD TO COLORS THAT ARE REPRODUCED BY AN OUTPUT DEVICE THAT ACTUALLY OUTPUTS

CROSS-REFERENCE TO RELATED APPLICATIONS

This application is based on and claims priority under 35 USC 119 from Japanese Patent Application No. 2009-106155 filed Apr. 24, 2009.

BACKGROUND

1. Technical Field

The present invention relates to a color conversion device, a color conversion method, and a computer readable medium.

2. Related Art

There is a technique for simulating color reproduction of a color output device (target output device) that differs depending on the color output device including black of CMYK and the like. This technique is called ink simulation and is, for example, utilized for the purpose of simulating color reproduction of a press with a printer and inexpensively realizing a proof. Further, the texture and sharpness of color reproduction are also preserved by a technique called "K amount preservation" where a K (black) amount of an image for press is also preserved in a printer.

However, usually the color reproduction characteristics of a target output device and an output device that actually outputs (actual output device) differ, so when the black amount in the target output device is used as is in the actual output device and color reproduction in the target output device is simulated, the output ends up becoming output in a color reproduction range that is narrower than the color reproduction range in the actual output device. Further, in xerographic printers and inkjet printers that are used in simulations, oftentimes a limit is disposed on the total amount of the color materials that are used, and this color material total amount limit increases the difference in color reproduction characteristics between the target output device and actual output device.

SUMMARY

According to an aspect of the present invention, there is provided a color conversion device, including: a limit value setting unit that sets, in accordance with a color gamut, a limit value of a color material total amount that is used in an output device that uses color materials of M color components including black where M is an integer equal to or larger than 4 and outputs an image; and a black amount determining unit that calculates a total amount limit value corresponding to the color gamut for each black amount on a basis of the limit value that has been set in accordance with the color gamut by the limit value setting unit and determines a black amount from a conversion target-independent color signal of a device-independent color space.

BRIEF DESCRIPTION OF THE DRAWINGS

Exemplary embodiments of the present invention will be described in detail based on the following figures, wherein.

DETAILED DESCRIPTION

First, in order to facilitate understanding of the exemplary embodiment of the present invention, a technique to which the exemplary embodiment of the present invention is applied will be described. In order to perform the aforementioned K amount preservation, it is necessary to calculate a minimum required black amount in regard to colors that are reproduced by an output device that actually outputs (actual output device). There are cases where preserving a black amount that falls below this minimum required black amount and performing color reproduction causes image defects and device impairment. Of course, even outside of K amount preservation, there is performed calculation of a minimum required black amount in each type of color conversion.

As a method of calculating a minimum required black amount from a color signal of a device-independent color space, there is a method that uses a pair of a color signal of several device-independent color spaces and a minimum required black amounts corresponding to that color signal to construct a model that calculates the minimum required black amount from the color signal of a device-independent color space and uses this model to calculate the minimum required black amount from the color signal of the device-independent color space that has been applied. Here, the pair of the color signal of the device-independent color space and the minimum required black amount is created by the color signal of the device-independent color space corresponding to an output color signal where several color materials other than black are an upper limit value or an output color signal where the sum of C, M, Y and K is equal to the color material total amount limit value in the actual output device and by the black amount corresponding to the color signal of that device-independent color space. The color signal of the device-independent color space from which this pair has been created is an outline configured by a color whose brightness is equal to or less than the brightness of a maximum saturation color in each color hue of an outline of a color gamut in a case where black is fixed, and this outline will hereinafter be called a lower outline.

Figure 6:
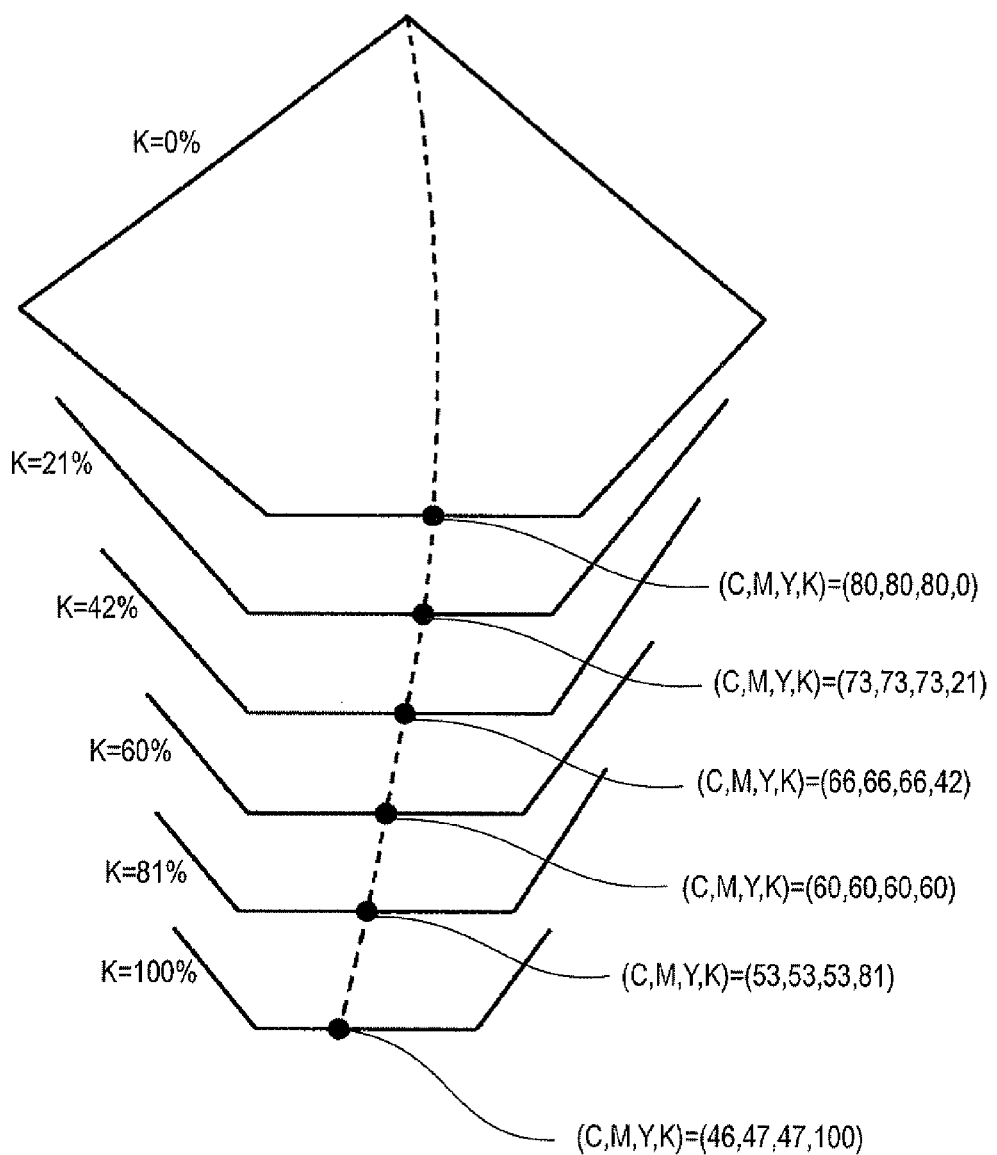
FIG. 6 is an explanatory diagram of one example of a color gamut outline and lower outlines of a CMYK output device in a case where a color material total amount limit value in a device-independent color space has been imposed across the board.

FIG. 6 is an explanatory diagram of one example of a color gamut outline and lower outlines of a CMYK output device in the case where the black amount is changed while the color material total amount limit value is held constant. In FIG. 6, the solid lines represent a color gamut outline in a case where the black amount is 0% and lower outlines in cases where the black amount is 21%, 42%, 60%, 81% and 100%. Further, the dashed line represents an achromatic baseline supposing color signals of a device-independent color space corresponding to the gradations of process black in a target output device. The black circles on this dashed line are points of intersection of the achromatic baseline and the lower outlines for each black amount. The examples of the values of CMYK in the colors of these black circles are examples in a case where the color material total amount limit value has been set to 240%.

Figure 7:
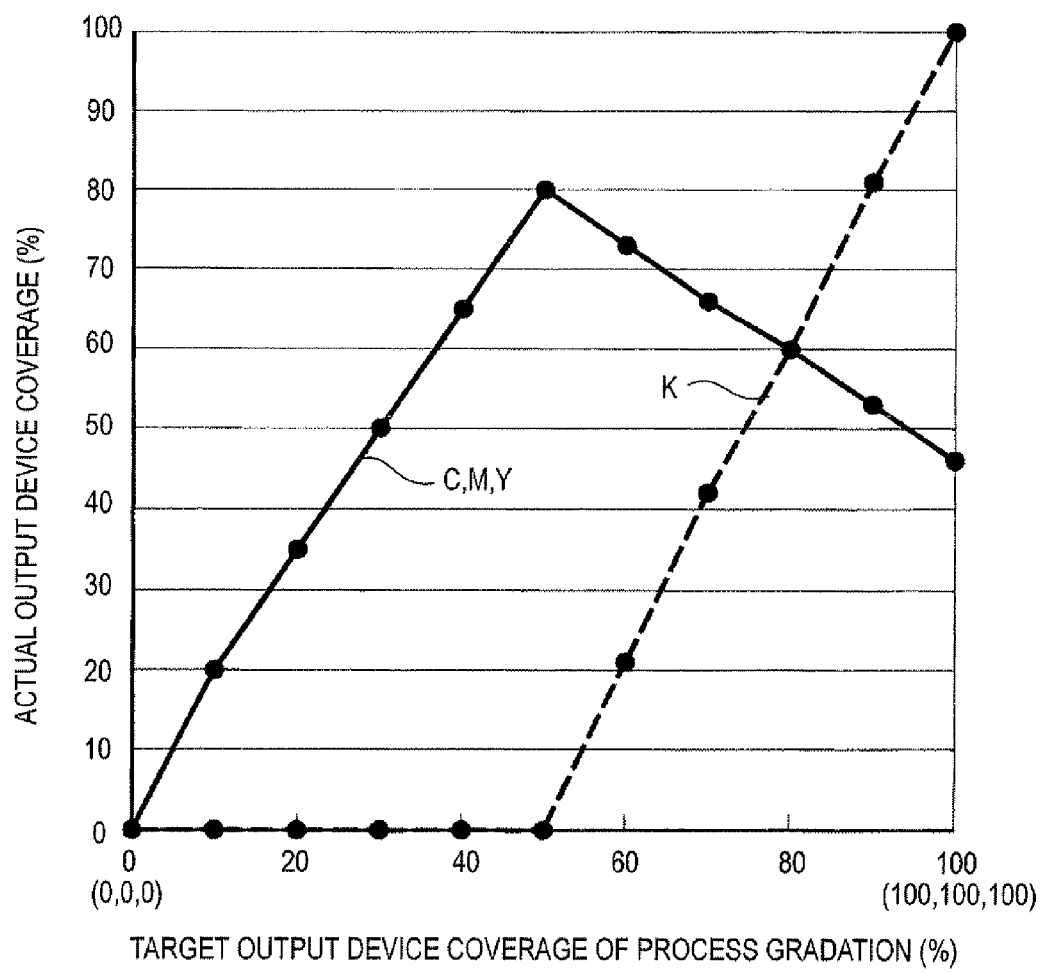
FIG. 7 is a graph showing one example of the relationship between the gradations of process black of a target output device and the coverage of each color component in an actual output device in the case where the color material total amount limit value has been imposed across the board.

FIG. 7 is a graph showing one example of the relationship between the gradations of process black of the target output device and the coverage of each color component in the actual output device in the case where the black amount is changed while the color material total amount limit value is held constant. As one example, in a case where there is applied a color signal representing process black that does not use black in the target output device, it becomes a color on the achromatic baseline represented by the dashed line in FIG. 6. As one example, colors change from a high-brightness side to a low-brightness side along this achromatic baseline. The black amount is preserved, so in the color gamut where K=0%, C, M and Y increase monotonously, but when the sum total of CMY exceeds the color material total amount limit value, the black amount must be increased and so that CMY take a downward turn. FIG. 7 shows this behavior between CMY and K (black amount). The decrease of CMY is shown also by the values of CMY at the points of the black circles shown in FIG. 6. It will be noted that, strictly speaking, the gradations of process black of the target output device and the gradations of process black of the actual output device do not match, but here, for the sake of convenience of description, C, M and Y of the color signal of the CMYK output device that reproduces the black circles are regarded as being of equal amounts.

In this manner, when the sum total of CMY exceeds the color material total amount limit value that is set in the actual output device, the upward trend of CMY reverses and CMY declines. Gradation deteriorates because of such upward and downward changes. For this reason, a total amount limit value (total amount limit value) is set in accordance with the black amount, for example, such that at least CMY does not take a downward turn. Here, a total amount limit value (total amount limit value) is set in accordance with the black amount in the achromatic baseline.

Figure 8:
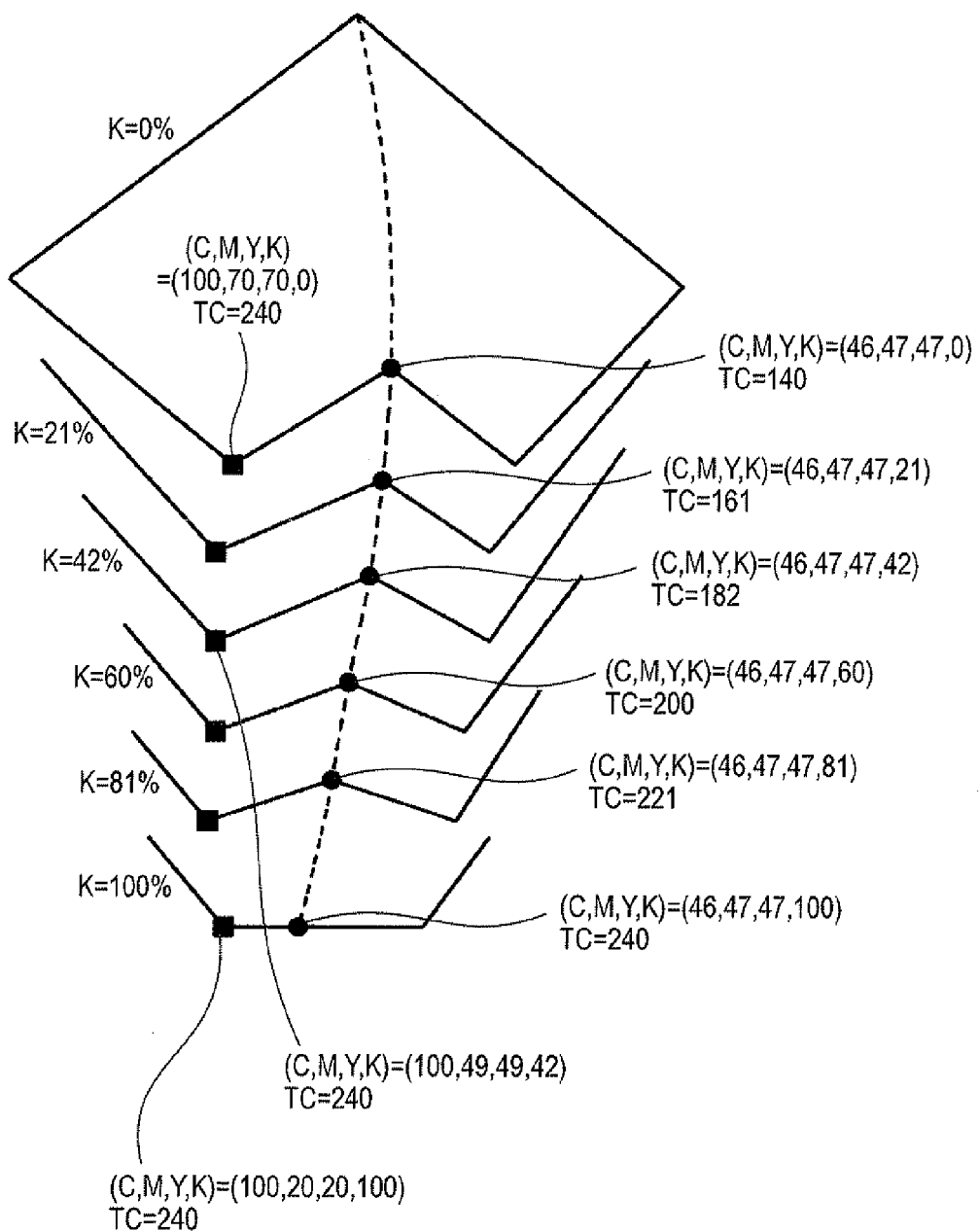
FIG. 8 is an explanatory diagram of one example of black amount limit values corresponding to black amounts and lower outlines.

FIG. 8 is an explanatory diagram of one example of black amount limit values corresponding to black amounts and lower outlines. In FIG. 8, the solid lines represent a color gamut outline in a case where the black amount is 0% and lower outlines in cases where the black amount is 21%, 42%, 60%, 81% and 100%. Further, the dashed line represents an achromatic baseline supposing color signal of a device-independent color space corresponding to the gradations of process black in the target output device. The black circles on this dashed line are points of intersection of the achromatic baseline and the lower outlines for each black amount.

In the example shown in FIG. 8, R−(100−K) represents color material total amount limit values (TC) in the achromatic baseline. Further, R (a color material total amount limit value imposed on the output device) represents a total amount limit value at the boundary portions (represented by the black squares in FIG. 8) outputted in the same color material total amount limit value imposed on the actual output device on the lower outlines. Additionally, the color material total amount limit values are determined so as to change monotonously with respect to the colors from the black circles to the black squares.

Figure 9:
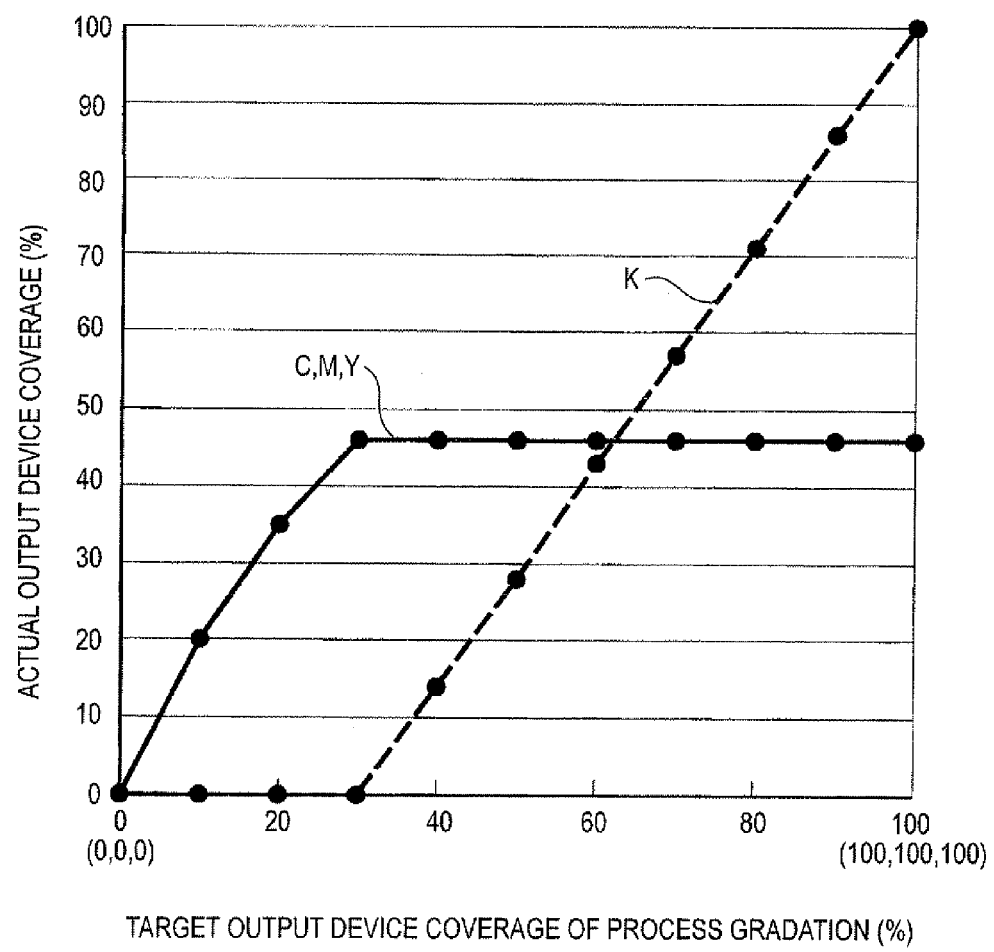
FIG. 9 is a graph showing one example of the relationship between the gradations of process black of a target output device and the coverage of each color component in an actual output device in a case where black amount limit values corresponding to black amounts have been set.

FIG. 9 is a graph showing one example of the relationship between the gradations of process black of the target output device and the coverage of each color component in the actual output device in a case where black amount limit values corresponding to black amounts have been set. In the graph shown in FIG. 9, none of CMYK takes a downward turn, and gradation deterioration is improved.

When the actual output device that actually outputs an image forms an image by an electrophotographic system or the like, as the color material amounts increases, the gloss resulting from the color materials becomes higher and is remarkable in colors that use many color materials such as tertiary colors and quaternary colors in comparison to primary colors. For this reason, differences in gloss caused by differences in color material amounts arise in an image, so there are cases where this can be perceived as image quality deterioration depending on the user of the actual output device. In the exemplary embodiment of the present invention that will be described below, such gloss resulting from an increase in color material amounts is controlled.

Figure 1:
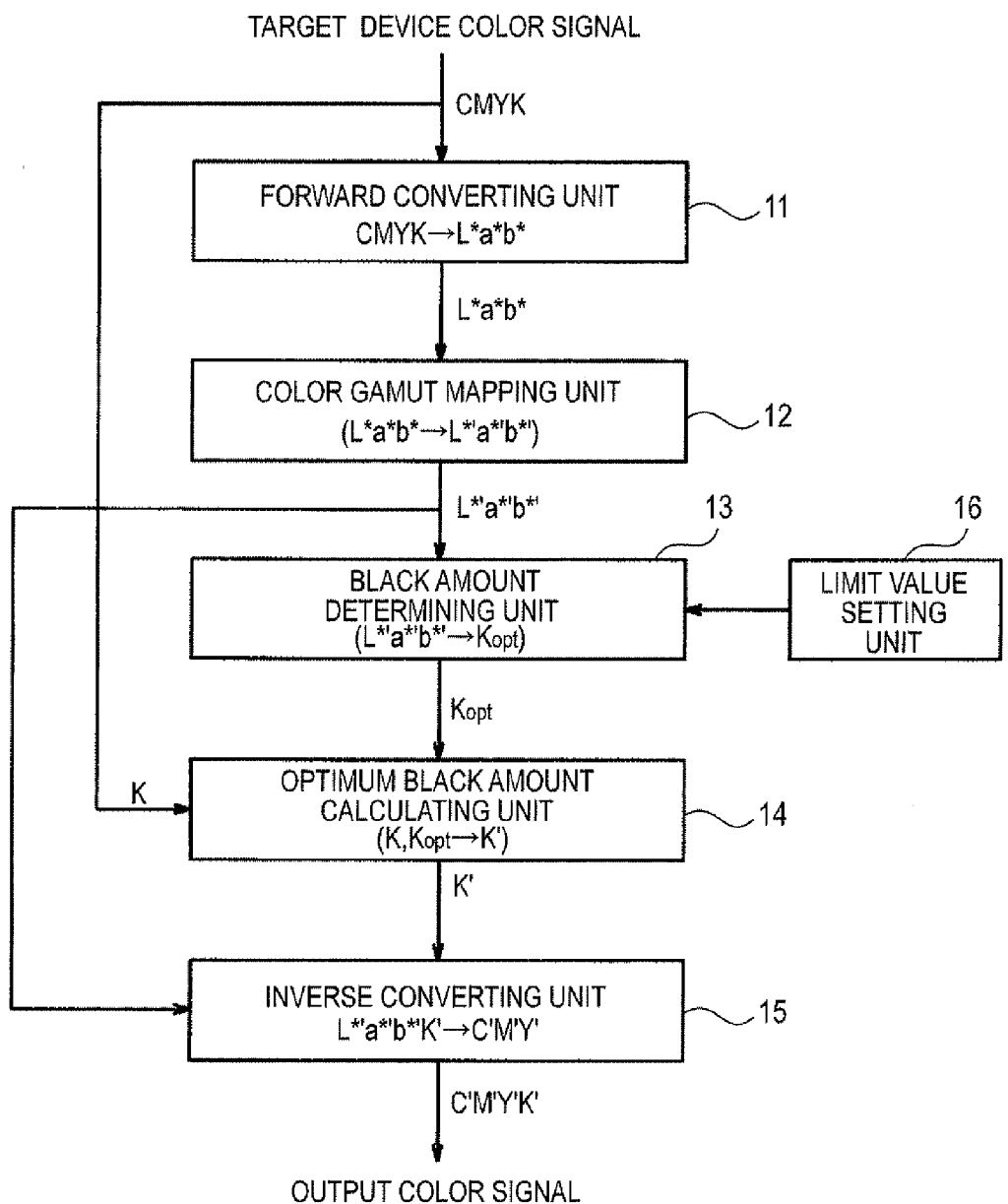
FIG. 1 is a configuration diagram showing an exemplary embodiment of the present invention.

FIG. 1 is a configuration diagram showing the exemplary embodiment of the present invention. In FIG. 1, 11 is a forward converting unit, 12 is a color gamut mapping unit, 13 is a black amount determining unit, 14 is an optimum black amount calculating unit, 15 is an inverse converting unit and 16 is a limit value setting unit. In the description below, a CMYK press will serve as the target output device, a CMYK printer will serve as the actual output device, and the invention will be described as converting a target device color signal (CMYK color signal) into an output color signal (C'M'Y'K' color signal). Further, unless it is limited by a color material total amount limit value, the invention will preserve the value of black (hereinafter, black amount) of the target device color signal and convert the target device color signal into the output color signal. It will be noted that, here, the invention will use the CIELAB color space as a device-independent color space that the invention uses during processing. It will be noted that the invention is not limited to this example; it suffices for the colors of the color materials that the target output device uses and the color components of the target device color signal to be N (N≥4) colors including black, and it suffices for the colors of the color materials that the actual output device uses and the color components of the output color signal to be M (M≥4) colors including black. Further, as for the device-independent color space, the invention may also use a color space that is not dependent on other devices, such as CIELUV.

The forward converting unit 11 converts the target device color signal to the color signal of the device-independent color space. Here, the forward converting unit 11 converts a CMYK color signal into a L*a*b* color signal. As this conversion method, the forward converting unit 11 may perform conversion by matrix conversion or conversion utilizing a model resulting from a neural network. Further, the forward converting unit 11 may utilize a known regression model.

The color gamut mapping unit 12 maps the color signal (L*a*b* color signal) of the device-independent color space that has been converted by the forward converting unit 11 into a color signal (L*'a*'b*' color signal) of the color gamut of the actual output device. As this mapping method, the color gamut mapping unit 12 may use various well-known methods. The mapped L*'a*'b*' color signal is made into a conversion target-independent color signal. It will be noted that, provided that the color signal of the device-independent color space that has been converted by the forward converting unit 11 is a color signal within the color gamut of the actual output device, it is acceptable if this color gamut mapping unit 12 is not disposed, and in that case, the color signal of the device-independent color space that has been converted by the forward converting unit 11 is made into the conversion target-independent color signal.

The black amount determining unit 13 calculates a total amount limit value corresponding to the color gamut for each black amount on the basis of a limit value that has been set in accordance with the color gamut by the limit value setting unit 16 and determines a black amount (Kopt) from the conversion target-independent color signal (L*'a*'b*' color signal) of the device-independent color space. Details of this black amount determining unit 13 will be discussed later.

The optimum black amount calculating unit 14 calculates an optimum black amount (K') from the black amount (Kopt) that has been determined by the black amount determining unit 13 and the black amount (K) of the target device color signal (CMYK color signal). As for the calculation method, the optimum black amount calculating unit 14 may, for example, control the degree of black amount preservation in accordance with saturation from the black amount (Kopt) and the black amount (K) of the target device color signal and calculate the optimum black amount (K'). A known technology may be applied to this optimum black amount calculating unit 14. It will be noted that the invention may be configured such that this optimum black amount calculating unit 14 is omitted, and in that case, the black amount (Kopt) that has been calculated by the black amount determining unit 13 is used instead of the optimum black amount (K').

The inverse converting unit 15 calculates color components (C', M' and Y') other than black of the M-dimensional output color signal (C'M'Y'K' color signal) whose components are the colors of the color materials that the actual output device uses from the optimum black amount (K') that has been calculated by the optimum black amount calculating unit 14 and the conversion target-independent color signal (L*'a*'b*' color signal). The inverse converting unit 15 outputs an output color signal (C'M'Y'K' color signal) created by the color components (C', M' and Y') that have been calculated by this inverse converting unit 15 and the optimum black amount (M).

The limit value setting unit 16 sets, in accordance with the color gamut, a limit value of the color material total amount that is used in the actual output device. As for the limit value that the limit value setting unit 16 sets, the color material total amount limit value imposed on the actual output device becomes an upper limit. As one example of setting, it is conceivable for the limit value setting unit 16 to set a limit value in an achromatic baseline to a value that is smaller than the color material total amount limit value imposed on the actual output device. Of course, in regard to other color gamuts, the limit value setting unit 16 may set a limit value that is smaller than the color material total amount limit value imposed on the actual output device. As for the setting method, for example, the limit value setting unit 16 may set a limit value of a color gamut that a user has set beforehand or a color gamut and a limit value, or the limit value setting unit 16 may determine beforehand unique limit values and color gamuts per type of the actual output device or per output mode that the actual output device has and set the limit value in accordance with the type of the actual output device to be utilized or the output mode. Of course, the limit value setting unit 16 may also apply the limit value beforehand as a fixed value.

Figure 2:
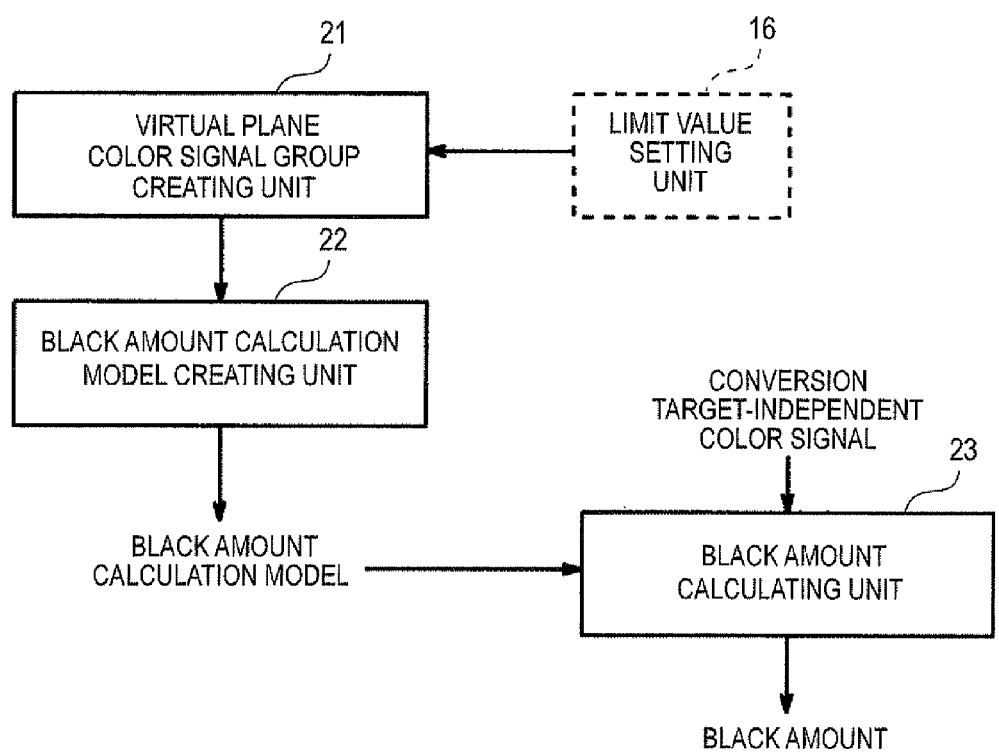
FIG. 2 is a configuration diagram showing one example of a black amount determining unit.

FIG. 2 is a configuration diagram showing one example of the black amount determining unit 13. In FIG. 2, 21 is a virtual plane color signal group creating unit, 22 is a black amount calculation model creating unit, and 23 is a black amount calculating unit. In the configuration shown in FIG. 1, the limit value that has been set by the limit value setting unit 16 and the conversion target-independent color signal (L*'a*'b*' color signal) derived from the color gamut mapping unit 12 is applied to the black amount determining unit 13.

The virtual plane color signal group creating unit 21 calculates the total amount limit value corresponding to the color gamut for each black amount on the basis of the limit value that has been set in accordance with the color gamut by the limit value setting unit 16 and creates a lower outline color signal that satisfies the total amount limit value that has been calculated. This lower outline color signal is a color signal in a device-dependent color space whose color components are the colors of the color materials that the actual output device uses. For example, the lower outline color signal is a CMYK color signal. It will be noted that the lower outline is, as discussed above, an outline configured by a color whose brightness is equal to or less than the brightness of the maximum saturation color in each color hue of the outline of a color gamut in a case where black is fixed.

The black amount calculation model creating unit 22 first calculates an independent color signal (L*a*b* color signal) in the corresponding device-independent color space in regard to each lower outline color signal (CMYK color signal) that has been created by the virtual plane color signal group creating unit 21. Additionally, the black amount calculation model creating unit 22 creates a model for calculating the black amount from the independent color signal (L*a*b* color signal) that has been created and the black amount of the lower outline to which that independent color signal belongs (the black component (K) of the lower outline color signal). For example, the black amount calculation model creating unit 22 may use a known method to create the model using a group of the lower outline color signals that have been created by the virtual plane color signal group creating unit 21 as a target. The present invention is not limited to this method and may use any method provided it is a method where the black amount (K) corresponding to the color signal of the device-independent color space that has been applied is calculated from discretely distributed device-independent color signals and the corresponding black amounts.

The black amount calculating unit 23 uses the model that has been created by the black amount calculation model creating unit 22 and calculates the black amount (Kopt) from the conversion target-independent color signal (L*'a*'b*' color signal) that has been applied. This black amount (Kopt) is delivered to the optimum black amount calculating unit 14, and the optimum black amount (K') is calculated from this black amount (Kopt) and the black amount (K) of the target device color signal (CMYK color signal).

It will be noted that, if the model is created beforehand by the virtual plane color signal group creating unit 21 and the black amount calculation model creating unit 22, then the invention may be configured such that the virtual plane color signal group creating unit 21 and the black amount calculation model creating unit 22 are not disposed when the black amount is calculated by the black amount calculating unit 23.

The black amount determining unit 13 will be described further using a specific example. It will be noted that, in the specific example below, SL will represent the color material total amount limit value of the actual output device and a limit value GL (GL<SL) is set with respect to the achromatic baseline in the limit value setting unit 16.

The virtual plane color signal group creating unit 21 first calculates, for each black amount (K), a total amount limit value (GTC) on the achromatic baseline in the device-independent color space on the basis of a limit value (GL) of the achromatic baseline that has been set by the limit value setting unit 16. For example, the virtual plane color signal group creating unit 21 calculates the total amount limit value (GTC) using the expression below where the upper limit value of the total amount of the color materials other than black becomes the limit value (GL).

$$GTC(K) = GL - (100 - K) \qquad (1)$$

Thus, there are no longer any sharp peaks in the gradations of C, M and Y of process black, and gradation jumps no longer occur.

Further, the virtual plane color signal group creating unit 21 may calculate the total amount limit value (GTC) using the expression below assuming that KB represents a minimum required actual output device black amount in order to reproduce a color signal when the black amount of the target output device has been made into a given value.

$$GTC(K) = GL - (KB - K) \qquad (2)$$

The black amount KB may be determined from a model considering the color material total amount limit value of the actual output device shown in FIG. 6, for example.

For example, in a case where the minimum required black amount KB in the actual output device in order to reproduce a color signal where the black amount of the target output device is 0% is 60%, there is no need to subtract 100 from the limit value (GL) of the achromatic baseline, and it suffices just to subtract 60. For example, assuming that the color material total amount limit value (GL) of the achromatic baseline is 240%, the total amount limit value (GTC) on the achromatic baseline corresponding to K=0% is 140% in a case where expression (1) is used. In contrast, in a case where expression (2) is used, the total amount limit value (GTC) on the achromatic baseline corresponding to K=0% becomes 180% and the color reproduction range at K 0% expands by that much. In this manner, in a case where expression (2) is used, the total amount limit value (GTC) on the achromatic baseline becomes larger and the range in which the black amount is saved expands.

Next, the virtual plane color signal group creating unit 21 calculates a total amount limit value (TC) outside the achromatic baseline such that the total amount limit value becomes closer to the color material total amount limit value (SL) that is a limit value of the outline as it becomes closer to the outline of the color gamut in a case where it is limited to the corresponding black amount using the total amount limit value (GTC) on the achromatic baseline as a reference. The virtual plane color signal group creating unit performs, for each black amount (K), this calculation of the total amount limit value (TC) outside the achromatic baseline.

For example, the virtual plane color signal group creating unit 21 calculates the total amount limit value (TC) outside the achromatic baseline using the expression below.

$$TC(C,M,Y,K) = (GTC(K) - SL) \times (1 - Ch(C,M,Y))^{\gamma} + SL \qquad (3)$$

Here, Ch (C, M, Y) is an index representing saturation determined from the color signal C, M and Y of the output device corresponding to the color signal on the device-independent color space that becomes the target of calculation of the color material total amount limit value. In a case where C=M=Y, Ch (C, M, Y)=0, and in a case where one color signal selected from C, M, and Y is 0% or 100%, Ch (C, M, Y) becomes 1. Further, γ is a gamma coefficient for designating how to change the color material total amount limit value from GTC (K) to SL with respect to a change in the saturation index and is set beforehand.

Moreover, the virtual plane color signal group creating unit 21 creates plural lower outline color signals that are color signals of a device-dependent color space that configure lower outlines corresponding to respective black amounts that satisfy the total amount limit values (TC) for each black amount that have been calculated. As the method for creating the lower outline color signals, here, there will be described an example where the virtual plane color signal group creating unit 21 calculates a CMYK color signal group on the lower outlines for each black amount that satisfies the color material total amount limit value (SL) in the actual output device, corrects each of the CMYK color signals that have been calculated into CMYK color signals that satisfy the aforementioned color material total amount limit values (TC), and creates the lower outline color signals. Of course, the method is not limited to this method.

First, the lower outlines for each black amount that satisfy the color material total amount limit value (SL) of the actual output device are configured from CMYK color signals where any of C, M, Y and K is 100% or which are equal to the color material total amount limit value (SL) of the achromatic baseline. In a given black amount (K), the virtual plane color signal group creating unit 21 may create C, M and Y that satisfy the aforementioned condition within a CMY total amount value obtained by subtracting the black amount (K) from the color material total amount limit value (SL) and make them into CMYK color signals of lower outlines that satisfy the color material total amount limit value (SL) in the given black amount (K) from CMY and the black amount (K). The virtual plane color signal group creating unit 21 changes the black amount (K) and acquires the CMYK color signals of the lower outlines. For example, the virtual plane color signal group creating unit 21 may change the black amount in intervals set beforehand such as 10% intervals and determine the CMYK color signals of the lower outlines.

Next, the virtual plane color signal group creating unit 21 calculates the total amount limit values (TC) by the aforementioned expression (3) or the like with respect to the CMYK color signals that satisfy the color material total amount limit value (SL) that has been created and corrects the original CMYK color signals such that the total amount value becomes this total amount limit value (TC). For example, the virtual plane color signal group creating unit 21 saves the original ratio of the C, M and Y color components and corrects the CMYK color signals such that the sum of C, M, Y and K becomes the color material total amount limit value (TC) without changing K. Alternatively, rather than the ratio of the C, M and Y color components, the virtual plane color signal group creating unit 21 may correct the CMYK color signals such that the sum of C, M, Y and K becomes equal to the total amount limit value (TC) by subtracting an equal amount at a time from the color components that have a positive value of the original C, M and Y color components. The virtual plane color signal group creating unit 21 makes the corrected and obtained CMYK color signals into the lower outline color signals.

Figure 3:
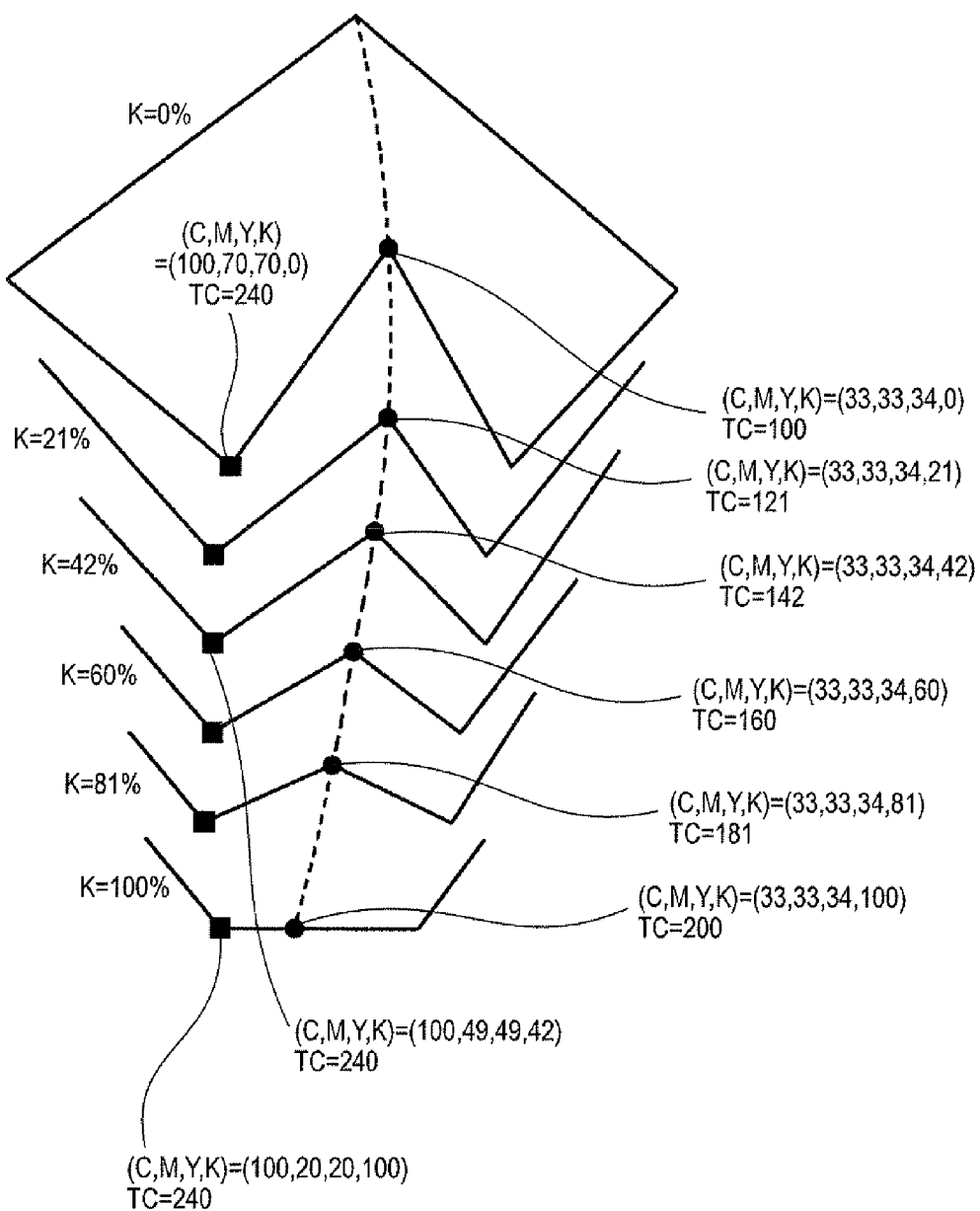
FIG. 3 is an explanatory diagram of one example of total amount limit values for each black amount and lower outlines that are set in the exemplary embodiment of the present invention.

FIG. 3 is an explanatory diagram of one example of total amount limit values for each black amount and lower outlines that are set in the exemplary embodiment the present invention. In FIG. 3, the solid lines represent a color gamut outline in a case where the black amount is 0% and lower outlines in cases where the black amount is 21%, 42%, 60%, 81% and 100%. Further, the dashed line represents an achromatic baseline supposing color signals of a device-independent color space corresponding to the gradations of process black in the target output device. The black circles on this dashed line are points of intersection of the achromatic baseline and the lower outlines for each black amount. Further, the black squares represent points of intersection between the color gamut outline where any of C, M and Y is 100% and outlines limited by the color material total amount limit value of the actual output device, and examples of specific values are shown in regard to several of the black squares.

FIG. 3 shows an example of a case where the color material total amount limit value (SL) imposed on the actual output device is 240% and where the limit value (GL) in the achromatic baseline is set to 200% as a limit value. The total amount limit value at the points of intersection with the lower outlines of each black amount represented by the black circles on the achromatic baseline is 100% in a case where the black amount is 0% and is thereafter 121%, 142%, 160% and 181% in cases where the black amount is 21%, 42%, 60% and 81%.

Further, in this example, in the colors represented by the black squares, the color material total amount limit value of the actual output device is set to become the total amount limit value, and the total amount limit value from these colors to the achromatic baseline is gradually changed to the limit values in the achromatic baseline.

By setting these total amount limit values, C, M and Y monotonously change in the achromatic baseline. Further, for example, even in the case where the black amount is 100%, the total amount of C, M, Y and K becomes limited by the limit value that is set and control of the total amount in accordance with the color gamut becomes performed. Even in the example shown in FIG. 3, there is performed variable total amount limitation that raises the total amount limit value in regions of high brightness or high saturation such as primary colors and secondary colors (colors using color materials of two colors) and lowers the total amount limit value in regions of low brightness or low saturation such as tertiary colors (colors using color materials of three colors) and quaternary colors (colors using color materials of four colors). Sometimes gloss resulting from large amounts of color materials becomes higher in tertiary and quaternary colors, and the gloss is controlled by limited the total amounts in these colors more than other colors.

The black amount calculation model creating unit 22 converts each of the group of lower outline color signals that are color signals configuring lower outlines that have been created by the virtual plane color signal group creating unit 21 into independent color signals that are color signals of the device-independent color space. Additionally, the black amount calculation model creating unit 22 creates the model for calculating the black amount corresponding to the color signal of the device-independent color space from the independent color signal that has been converted and the black amount (K) of the lower outline color signal corresponding to that independent color signal. As for the method of creating the model, the black amount calculation model creating unit 22 may, for example, use a known method to create the model using as a target the group of lower outline color signals that have been created by the virtual plane color signal group creating unit 21. Of course, the method is not limited to this method.

In this manner, the black amount calculation model creating unit 22 previously creates the model for calculating the black amount from the color signal of the device-independent color space that has been applied and delivers the model to the black amount calculating unit 23. It will be noted that it is not necessary to dispose the black amount calculating unit 23 when creating the model and that it is acceptable if the virtual plane color signal group creating unit 21 and the black amount calculation model creating unit 22 are not disposed when creating the model and calculating the black amount in the black amount calculating unit 23.

When the target device color signal for outputting by the target output device is applied, the forward converting unit 11 converts the target device color signal (CMYK color signal) to the color signal (L*a*b* color signal) of the device-independent color space. After the color gamut mapping unit 12 maps the color signal (L*a*b* color signal) of the device-independent color space that has been converted into the color signal (L*'a*'b*' color signal) of the color gamut of the actual output device, the color signal (L*'a*'b*' color signal) after mapping is delivered to the black amount determining unit 13 as the conversion target-independent color signal.

The black amount calculating unit 23 of the black amount determining unit 13 uses the model for calculating the black amount that has been created by the black amount calculation model creating unit 22 as discussed above and calculates the black amount (Kopt) from the conversion target-independent color signal (L*'a*'b*' color signal) that has been applied. This black amount (Kopt) becomes the output of the black amount determining unit 13 and is delivered to the optimum black amount calculating unit 14.

The optimum black amount calculating unit 14 calculates the optimum black amount (K') from the black amount (Kopt) that has been delivered from the black amount determining unit 13 and the black amount (K) of the target device color signal (CMYK color signal). The calculation method is as has been discussed already.

The inverse converting unit 15 calculates the color components other than black, which here are C, M and Y, from the optimum black amount (K') that has been calculated by the optimum black amount calculating unit 14 and the conversion target-independent color signal (L*'a*'b*' color signal) after being mapped by the color gamut mapping unit 12. Usually conversion from a LAB color space to the CMYK color space is not unequivocally determined because it is conversion where dimensions increase, but CMY is unequivocally determined by fixing the optimum black amount (K'). This conversion may use the color conversion model in the actual output device.

In this manner, the target device color signal including black in the target output device is converted into the output color signal including black in the actual output device. At that time, not only the color material total amount limit value (SL) imposed on the actual output device but, in the aforementioned example, the invention sets the total amount limit value in accordance with the limit value that has been set on the achromatic baseline, determines the black amount and moreover calculates the optimum black amount. Thus, as for the obtained output color signal, the total amount is controlled more than the color material total amount limit value in tertiary colors and quaternary colors where gloss easily arises, and the gloss becomes controlled. Further, the respective color components of C, M and Y also exhibit monotonous change in the achromatic baseline, for example, and gradation deterioration is also controlled.

It will be noted that the invention may use the aforementioned configuration to directly color-convert the target device color signal into the output color signal and that the invention may be configured to correlate as output values CMYK values obtained by color-converting, using the aforementioned configuration, CMYK color signals corresponding to input values (grid points) of a multidimensional table to thereby create a multidimensional table that realizes color conversion and perform color conversion of a CMYK image using that multidimensional table.

In the aforementioned example, there has been described a case where each color material is used up to 100% without disposing a limit with respect to each color material. Depending on the actual output device, there are cases where a single color limit is disposed in regard to each color material, and an example of a case where a single color limit is disposed will be described below. It will be noted that the single color limit value may be previously determined or configured such that a user sets it in the limit value setting unit 16. Further, a common value may be set for each color component, or the single color limit value may be configured such that a single color limit value of C (CL), a single color limit value of M (ML), a single color limit value of Y (YL) and a single color limit value of K (KL) are respectively set. In the description below, SL will represent the color material total amount limit value of the actual output device, and a limit value TL (TL<SL) and single color limit values (CL, ML, YL and KL) of each color material of C, M, Y and K are set with respect to an achromatic baseline in the limit value setting unit 16.

The virtual plane color signal group creating unit 21 of the black amount determining unit 13 first calculates, for each black amount (K) and within the range of the limit value (KL) of the black amount (K), the total amount limit value (GTC) on the achromatic baseline in the device-independent color space on the basis of the limit value (KL) of black (K) that is set in the limit value setting unit 16 and the limit value (TL) that is set on the achromatic baseline. For example, the virtual plane color signal group creating unit 21 calculates the total amount limit value (GTC) using the expression below where the upper limit of the total amount of the color materials other than black becomes the limit value (TL).

$$GTC(K)=TL-(KL-K) \quad (4)$$

For example, in a case where the limit value of K (KL) is 90% and the color material total amount limit value (TL) is 180%, the virtual plane color signal group creating unit 21 calculates the total amount limit value (GTC) on the achromatic baseline in the range of K=0% or greater and 90% or less, so GTC=90% in the case of K=0% and GTC=180% in the case of K=90%.

Further, as indicated as expression (2), the virtual plane color signal group creating unit 21 may calculate the total amount limit value (GTC) using the expression below assuming that KB (KB is equal to or less than KL) represents the minimum required actual output device black amount in order to reproduce a color signal when the black amount of the target output device is made into a given value.

$$GTC(K)=TL-(KB-K) \quad (5)$$

The black amount KB may be determined from a model considering the color material total amount limit value of the actual output device shown in FIG. 6, for example.

Next, the virtual plane color signal group creating unit 21 calculates the total amount limit value (TC) outside the achromatic baseline such that the total amount limit value becomes closer to the color material total amount limit value (SL) that is a limit value of the outline as it becomes closer to the outline of the color gamut in a case where it is limited to the corresponding black amount using the total amount limit value (GTC) on the achromatic baseline as a reference. The virtual plane color signal group creating unit performs, for each black amount (K), this calculation of the total amount limit value (TC) outside the achromatic baseline.

For example, the virtual plane color signal group creating unit 21 calculates the total amount limit value (TC) outside the achromatic baseline using the expression below.

$$TC(C,M,Y,K)=(GTC(K)-SL) \times (1-Ch(C,M,Y))^{\gamma}+SL \quad (6)$$

Here, Ch (C, M, Y) is an index representing saturation determined from the color signals C, M and Y of the output device corresponding to the color signal on the device-independent color space that becomes the target of calculation of the color material total amount limit value. In a case where C=M=Y, Ch (C, M, Y) becomes 0, and in a case where C or M or Y is 0% or 100%, Ch (C, M, Y) becomes 1. Further, $\gamma$ is a gamma coefficient for designating how to change the color material total amount limit value from GTC (K) to SL with respect to a change in the saturation index and is set beforehand.

Moreover, the virtual plane color signal group creating unit 21 creates a plural lower outline color signals that are color signals of a device-dependent color space that configure lower outlines in the device-independent color space corresponding to respective black amounts that satisfy the total amount limit values (TC) for each black amount that have been calculated within the range of the single color limit value of the black amount (KL), the single color limit value of C (CL), the single color limit value of M (ML) and the single color limit value of Y (YL). As the method for creating the lower outline color signals, here, there will be described an example where the virtual plane color signal group creating unit 21 calculates a CMYK color signal group on the lower outlines for each black amount that satisfies the color material total amount limit value (SL) in the actual output device, corrects each of the CMYK color signals that have been calculated into CMYK color signals that satisfy the aforementioned color material total amount limit values (TC), and creates the lower outline color signals. Of course, the method is not limited to this method.

First, the lower outlines for each black amount that satisfy the color material total amount limit value (SL) of the actual output device are configured from CMYK color signals where any of C, M, Y and K is the single color material amount limit value or which are equal to the color material total amount limit value (SL). In a given black amount (K), the virtual plane color signal group creating unit 21 may create C, M and Y that satisfy the aforementioned condition within a CMY total amount value obtained by subtracting the corresponding black amount from the color material total amount limit value (SL) and make them into CMYK color signals of lower outlines that satisfy the color material total amount limit value (SL) in the given black amount (K) from CMY and the black amount (K). For example, in a case where the single color limit values of C, M, Y and K (CL, ML, YL and KL) are 90% and the color material total amount limit value (SL) is 180%, at K=0%, the CMY total amount value becomes 180%, so the virtual plane color signal group creating unit 21 may create C, M and Y where any of C, M and Y is 90% or where the CMY total amount value becomes 180%. Further, if K is 90%, the CMY total amount value becomes 90%, so the virtual plane color signal group creating unit 21 creates C, M and Y where any of C, M and Y is 90% or where the CMY total amount value becomes 90%. The virtual plane color signal group creating unit 21 changes the black amount (K) and acquires the CMYK color signals of the lower outlines. For example, the virtual plane color signal group creating unit 21 may change the black amount within the range of the single color limit value of K (KL) in intervals set beforehand such as 10% intervals and determine the CMYK color signals of the lower outlines.

Next, the virtual plane color signal group creating unit 21 calculates the color material total amount limit values (TC) by the aforementioned expression (6) or the like with respect to the CMYK color signals that satisfy the color material total amount limit value (SL) that has been created and corrects the original CMYK color signals such that the total amount value becomes this color material total amount limit value (TC). For the correction method, the virtual plane color signal group creating unit 21 may use the aforementioned method in the case where the single color limits are not imposed.

Figure 4:
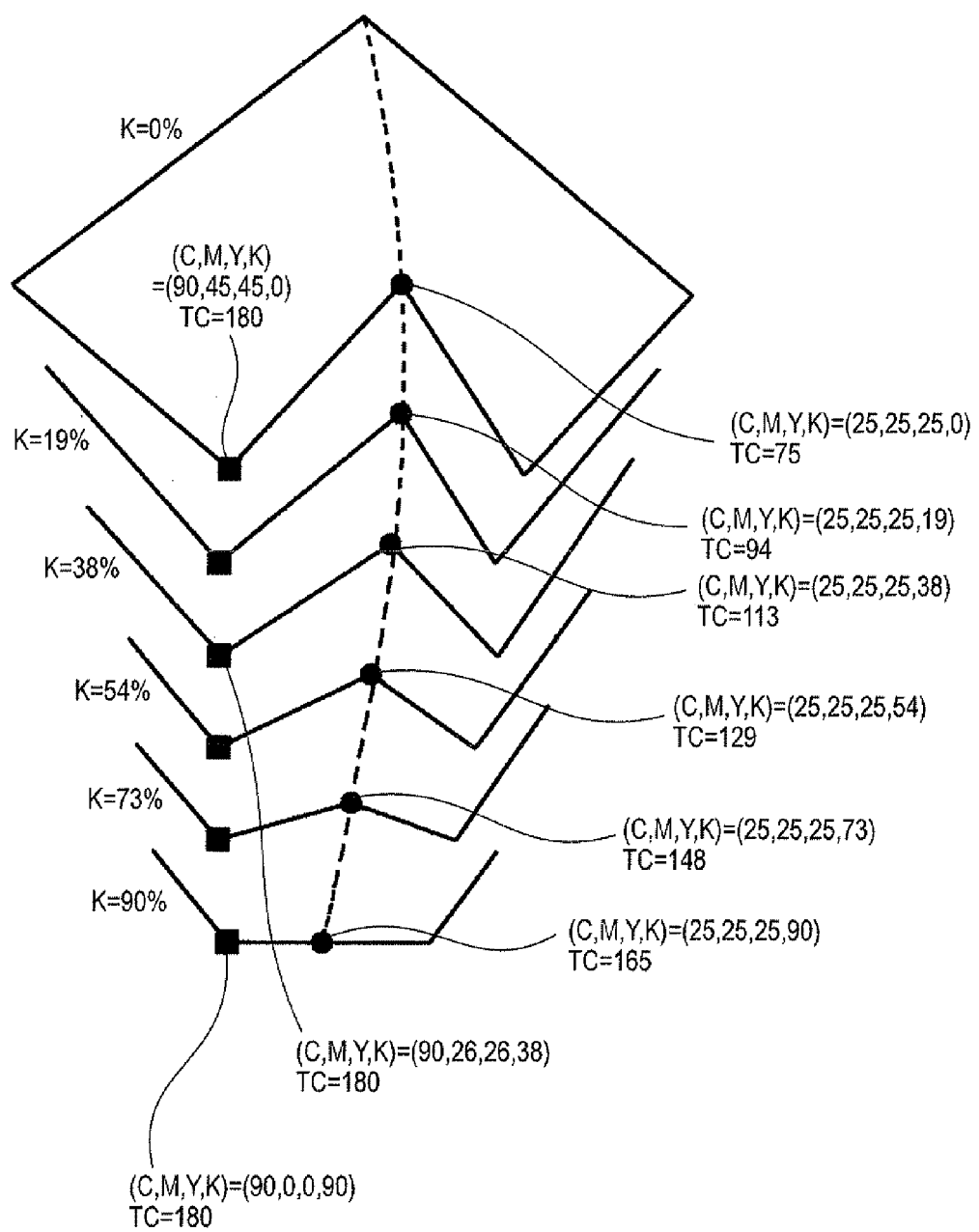
FIG. 4 is an explanatory diagram of another example of total amount limit values for each black amount and lower outlines that are set in the exemplary embodiment of the present invention.

FIG. 4 is an explanatory diagram of another example of total amount limit values for each black amount and lower outlines that are set in the exemplary embodiment of the present invention. In FIG. 4, the solid lines represent a color gamut outline in a case where each single color limit is 90% and the black amount is 0% and lower outlines in cases where the black amount is 19%, 38%, 54%, 73% and 90%. Further, the dashed line represents an achromatic baseline supposing color signals of a device-independent color space corresponding to the gradations of process black in the target output device. The black circles on this dashed line are points of intersection of the achromatic baseline and the lower outlines for each black amount. Further, the black squares represent points of intersection between the color gamut outline where any of C, M and Y is 90% which is the single color limit value and outlines limited by the color material total amount limit value of the actual output device, and examples of specific values are shown in regard to several of the black squares. It will be noted that the color material total amount limit value imposed on the actual output device is 180% and that the limit value in the achromatic baseline is set to 165%. Further, in this example, in the colors represented by the black squares, the color material total amount limit value of the actual output device is set to become the total amount limit value.

By setting these total amount limit values, C, M and Y monotonously change in the achromatic baseline. Further, for example, even in the case where the black amount becomes 90% of the single color limit value, the total amount of C, M, Y and K becomes limited by the limit value that is set and control of the total amount in accordance with the color gamut becomes performed. Even in the example shown in FIG. 4, there is performed variable total amount limitation that satisfies the single color limit values and the color material total amount limit value, raises the total amount limit value in regions of high brightness or high saturation such as primary colors and secondary colors (colors using color materials of two colors) and lowers the total amount limit value in regions of low brightness or low saturation such as tertiary colors (colors using color materials of three colors) and quaternary colors (colors using color materials of four colors). The single color limit values are set in order to control gloss that arises as a result of the coverage of single colors increasing, but together with this control of gloss, the gloss is controlled by setting limit values also in regard to secondary colors, tertiary colors and quaternary colors.

After the group of lower outline color signals that are color signals configuring lower outlines have been created in this manner by the virtual plane color signal group creating unit 21, then it suffices to perform processing from the black amount calculation model creating unit 22 on that was described as processing in the aforementioned case where the single color limit values are not disposed. Even when single color limit values are set, there is provided a model that calculates the black amount (Kopt) from the conversion target-independent color signal (L*'a*'b*' color signal) and there is performed color conversion from the target device color signal to the output color signal including color conversion using that model.

In each of the aforementioned examples, a limit value different from the color material total amount limit value of the actual output device was set with respect to the achromatic baseline. The invention is not limited to this, and moreover a limit value may also be disposed. For example, a limit value different from the color material total amount limit value of the actual output device may be set in the color gamuts represented by the black squares in FIG. 3 or FIG. 4. In this case, the colors represented by the black squares are colors where any of the color materials other than black becomes 100% or a single color limit value in the color gamut in a given black amount and is a color where the total amount becomes the set limit value. Of course, a limit value different from the color material total amount limit value of the actual output device may also be set in a color gamut other than this.

Figure 5:
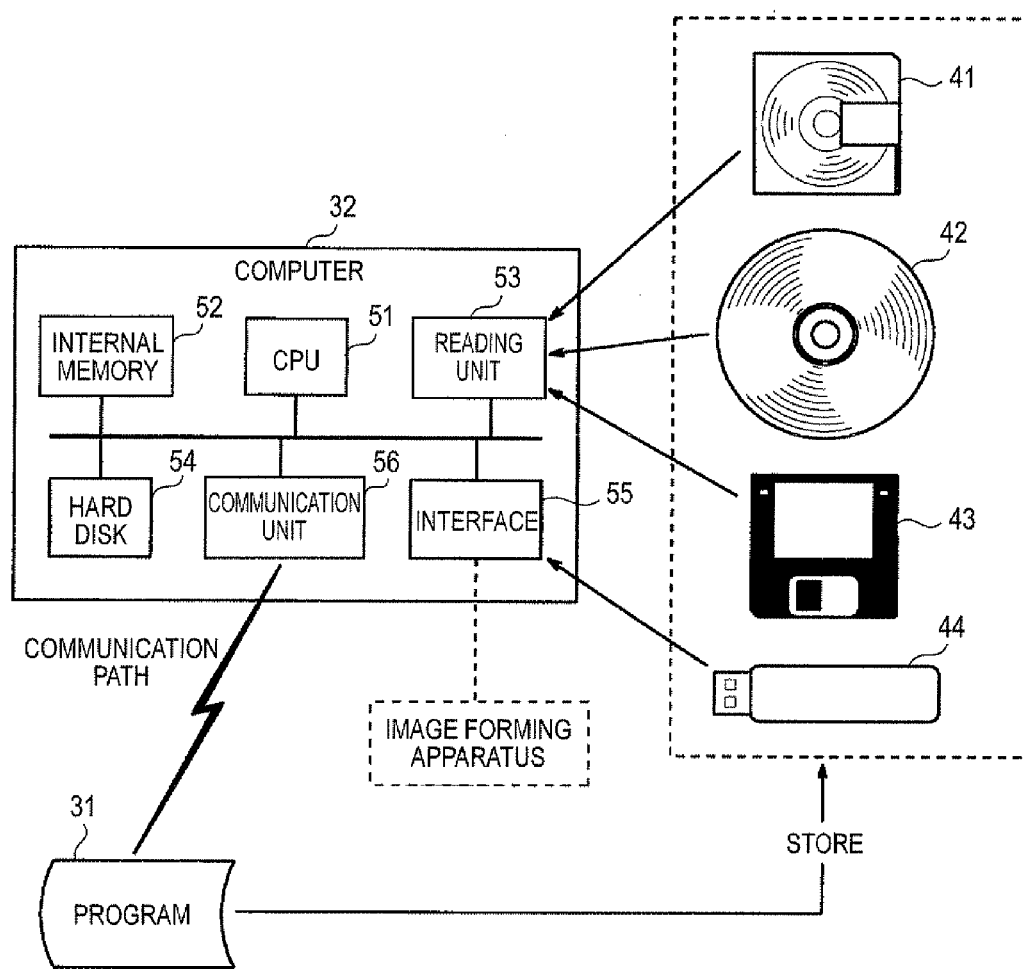
FIG. 5 is an explanatory diagram of one example of a computer program, a storage medium in which that computer program is stored, and a computer when the functions described in the exemplary embodiment of the present invention are realized by a computer program.

FIG. 5 is an explanatory diagram of one example of a computer program, a storage medium storing that computer program, and a computer in a case where the functions described in the exemplary embodiment of the present invention are realized by a computer program. In FIG. 5, 31 is a program, 32 is a computer, 41 is a magnetic-optical disk, 42 is an optical disk, 43 is a magnetic disk, 44 is a memory, 51 is a CPU, 52 is an internal memory, 53 is a reading unit, 54 is a hard disk, 55 is an interface and 56 is a communication unit.

The functions of each unit described in the exemplary embodiment of the present invention may be realized entirely or partially by the program 31, which is executable by the computer 32. In that case, the program 31 and data used by the program 31 may be stored in storage media that are read by the computer 32. The storage media are media that cause a change in magnetic, optical or electrical energy in accordance with the description content of the program 31 with respect to the reading unit 53 with which the hardware resources of the computer are disposed and conveys the description content of the program 31 to the reading unit 53 in a signal format corresponding thereto. For example, the storage media include the magnetic-optical disk 41, the optical disk 42 (including a CD, a DVD, etc.) the magnetic disk 43 and the memory 44 (including an IC card, a memory card, etc.). Of course, these storage media are not limited to portable storage media.

The program 31 is stored in these storage media, is read from the computer after the storage media have been loaded into the reading unit 53 or the interface 55 of the computer 32, for example, is stored in the internal memory 52 or the hard disk 54 and is executed by the CPU 51, whereby the functions described in the exemplary embodiment of the present invention are realized entirely or partially. Alternatively, the program 31 may be transferred to the computer 32 via a communication path, received by the communication unit 56 in the computer 32, stored in the internal memory 52 or the hard disk 54 and executed by the CPU 51.

The computer 32 may also be connected to various devices via the interface 55. For example, a display unit that displays information or a receiving unit that receives information from a user may also be connected to the computer 32. For example, the limit value setting unit 16 may be configured to receive limit value setting by a user from a receiving unit. Further, for example, an image forming apparatus serving as an output device may be connected to the computer 32 via the interface 55 so that the image forming apparatus forms an image using the output color signals that have been converted. In this case, the image forming apparatus that is connected to the computer 32 becomes the actual output device.

It will be noted that it is not necessary for each configuration to operate in a single computer and that processing may be executed by separate computers in accordance with the processing stage. For example, processing until the creation of the model for calculating the black amount and processing that performs color conversion from the target device color signals to the output color signals including color conversion using that model may be performed by separate computers.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. A color conversion device, comprising:
a limit value setting unit that sets, in accordance with a color gamut, a limit value of a color material total amount that is used in an output device that uses color materials of M color components including black where M is an integer equal to or larger than 4 and outputs an image; and
a black amount determining unit that calculates a total amount limit value corresponding to the color gamut for each black amount on a basis of the limit value that has been set in accordance with the color gamut by the limit value setting unit and determines a black amount from a conversion target-independent color signal of a device-independent color space,
wherein a virtual plane color signal group creating unit that creates a lower outline color signal that satisfies the total amount limit value that has been calculated for each black amount on the basis of the limit value that has been set in accordance with the color gamut.

2. The color conversion device according to claim 1, wherein the black amount determining unit includes
a black amount calculation model creating unit that calculates an independent color signal in a corresponding device-independent color space from the lower outline color signal and creates a model for calculating a black amount from the independent color signal and a black amount of a lower outline to which that independent color signal belongs, and
a black amount calculating unit that uses the model that has been created by the black amount calculation model creating unit and calculates the black amount from the conversion target-independent color signal.

3. The color conversion device according to claim 2, further comprising:
a forward converting unit that converts a target device color signal of an N-dimensional color space in a target output device that uses color materials of N colors including black, where N is an integer equal to or larger than 4, into the conversion target-independent color signal of the device-independent color space;
an optimum black amount calculating unit that calculates an optimum black amount from the black amount that has been determined by the black amount determining unit and the black amount of the target device color signal; and
an inverse converting unit that calculates color components other than black of the M-dimensional output color signal whose components are colors of color materials that the output device uses from the optimum black amount that has been calculated by the optimum black amount calculating unit and the conversion target-independent color signal,
wherein the color conversion device outputs an output color signal created by the color components that have been calculated by the inverse converting unit and the optimum black amount.

4. The color conversion device according to claim 2, wherein the limit value in an achromatic baseline differs from the limit value of other color gamuts.

5. The color conversion device according to claim 1, further comprising:
a forward converting unit that converts a target device color signal of an N-dimensional color space in a target output device that uses color materials of N color components including black, where N is an integer equal to or larger than 4, into the conversion target-independent color signal of the device-independent color space;
an optimum black amount calculating unit that calculates an optimum black amount from the black amount that has been determined by the black amount determining unit and the black amount of the target device color signal; and
an inverse converting unit that calculates color components other than black of the M-dimensional output color signal whose components are colors of color materials that the output device uses from the optimum black amount that has been calculated by the optimum black amount calculating unit and the conversion target-independent color signal,
wherein the color conversion device outputs an output color signal created by the color components that have been calculated by the inverse converting unit and the optimum black amount.

6. The color conversion device according to claim 5, wherein the limit value in an achromatic baseline differs from the limit value of other color gamuts.

7. The color conversion device according to claim 1, wherein the limit value in an achromatic baseline differs from the limit value of other color gamuts.

8. The color conversion device according to claim 1, wherein use amount is limited for each color material in the output device.

9. A non-transitory computer readable storage medium storing a color conversion program that causes a computer to execute the functions of the color conversion device according to claim 1.

10. A color conversion device comprising:
a forward converting unit that converts a target device color signal of an N-dimensional color space in a target output device that uses color materials of N colors including black, where N is an integer equal to or larger than 4, into a conversion target-independent color signal of a device-independent color space;

a black amount determining unit that determines a black amount from the conversion target-independent color signal that has been converted by the forward converting unit, wherein a virtual plane color signal group creating unit that creates a lower outline color signal that satisfies the total amount limit value that has been calculated for each black amount on the basis of the limit value that has been set in accordance with the color gamut;

an optimum black amount calculating unit that calculates an optimum black amount from the black amount that has been determined by the black amount determining unit and the black amount of a target device color signal; and an inverse converting unit that calculates color components from the optimum black amount and the conversion target-independent color signal, the color components being color components except black of an M-dimensional output color signal containing color materials of M color components including black, where M is an integer equal to or larger than 4, which is actually used by a target output device, wherein the color conversion device outputs an output color signal created by the color components and the optimum black amount, the black amount determining unit uses a model for calculating the black amount to determine the black amount from the conversion target-independent color signal, the model is created by an independent color signal in the device-independent color space calculated from the lower outline color signal and the black amount of the lower outline to which the independent color signal belongs, a lower outline color signal satisfies the calculated total amount limit value, and a total amount limit value is calculated in accordance with the color gamut for each black amount on the basis of a limit value in which an upper limit of a total amount of the color materials that are used in the target output device has been set in accordance with the color gamut.

11. The color conversion device according to claim 10, wherein the total amount limit value is obtained by subtracting an upper limit value of the black amount from the limit value that is set in the achromatic baseline and adding the black amount to the subtracted value.

12. The color conversion device according to claim 11, wherein the black amount determining unit calculates the total amount limit value for each black amount on the achromatic baseline in the device-independent color space on the basis of the limit value that has been set in the achromatic baseline, and determines the total amount limit value for each black amount such that the total amount limit value becomes closer to the limit value in the outline of the color gamut as it becomes closer to the limit value in the outline of the color gamut toward the outline of the color gamut in the corresponding black amount on the basis of the total amount limit value.

13. The color conversion device according to claim 10, wherein the black amount determining unit calculates the total amount limit value for each black amount on the achromatic baseline in the device-independent color space on the basis of the limit value that has been set in the achromatic baseline, and determines the total amount limit value for each black amount such that the total amount limit value becomes closer to the limit value in the outline of the color gamut as it becomes closer to the limit value in the outline of the color gamut toward the outline of the color gamut in the corresponding black amount on the basis of the total amount limit value.

14. The color conversion device according to claim 10, wherein use amount is limited for each color material in the output device.

15. A non-transitory computer readable storage medium storing a color conversion program that causes a computer to execute the functions of the color conversion device according to claim 10.

16. A color conversion method, comprising:
setting, in accordance with a color gamut, a limit value of a color material total amount that is used in an output device that uses color materials of M colors including black, where M is an integer equal to or larger than 4, and outputs an image; and calculating a total amount limit value corresponding to the color gamut for each black amount on the basis of the limit value that has been set in accordance with the color gamut by the limit value setting, and determining a black amount from a conversion target-independent color signal of a device-independent color space, wherein the black amount determining includes creating a lower outline color signal that satisfies the total amount limit value that has been calculated for each black amount on the basis of the limit value that has been set in accordance with the color gamut.

17. The color conversion method according to claim 16, wherein the black amount determining includes
calculating an independent color signal in the corresponding device-independent color space from the lower outline color signal and creating a model for calculating a black amount from the independent color signal and the black amount of the lower outline to which that independent color signal belongs, and using the model that has been created by the black amount calculation model creating and calculating the black amount from the conversion target-independent color signal.

18. The color conversion method according to claim 16, further comprising:
converting a target device color signal of an N-dimensional color space in a target output device that uses color materials of N colors including black, where N is an integer equal to or larger than 4, into the conversion target-independent color signal of the device-independent color space;

calculating an optimum black amount from the black amount that has been determined by the black amount determining and the black amount of the target device color signal; and calculating color components other than black of the M-dimensional output color signal whose components are colors of color materials that the output device uses from the optimum black amount that has been calculated by the optimum black amount calculating and the conversion target-independent color signal, wherein the color conversion method outputs an output color signal created by the color components that have been calculated by the inverse converting and the optimum black amount.

19. The color conversion method according to claim 16, further comprising:
converting a target device color signal of an N-dimensional color space in a target output device that uses color materials of N colors including black, where N is an integer equal to or larger than 4, into the conversion target-independent color signal of the device-independent color space;

calculating an optimum black amount from the black amount that has been determined by the black amount determining and the black amount of the target device color signal; and calculating color components other than black of the M-dimensional output color signal whose components are colors of color materials that the output device uses from the optimum black amount that has been calculated by the optimum black amount calculating and the conversion target-independent color signal, wherein the color conversion method outputs an output color signal created by the color components that have been calculated by the inverse converting and the optimum black amount.

* * * * *